Nov. 17, 1936.  H. F. PARKER ET AL  2,060,891
BRAKE
Original Filed May 21, 1930
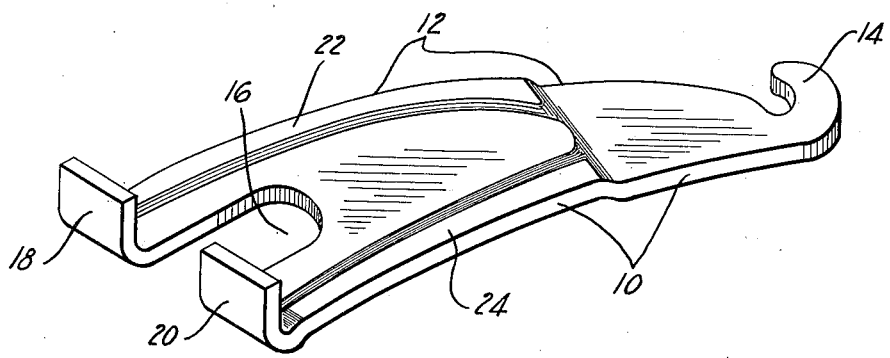
INVENTOR.
BRYAN E. HOUSE
HUMPHREY F. PARKER
BY
ATTORNEY

UNITED STATES PATENT OFFICE 2,060,891

BRAKE

Humphrey F. Parker, New York, N. Y., and Bryan E. House, South Bend, Ind., assignors to Bendix Brake Company, South Bend, Ind., a corporation of Illinois Original application May 21, 1930, Serial No. 454,250. Divided and this application October 14, 1933, Serial No. 693,561

3 Claims. (Cl. 74—519)

This invention relates to brakes, and is illustrated as embodied in a novel, simple and inexpensive operating lever for a brake. An object of the invention is to provide a simple and strong lever which can be made by mass production methods, preferably as a sheet metal stamping, or as a forging in the case of large brakes where extra strength is necessary.

Another object, which makes the use of sheet metal especially desirable, is to make the lever flat, so that it may be arranged alongside of the web of one of the brake shoes, between the shoe and the backing plate of the brake. Preferably, the wide end of the lever has integral thrust lugs or other means projecting laterally between the ends of the brake shoes, and in the illustrated arrangement there is an opening between these lugs through which the brake anchor passes.

To make the lever as long as possible, we curve one side to give additional clearance with respect to the brake drum. The narrower end of the lever may be formed with a hook in the plane of the lever, or otherwise provided with means for the attachment of a cable or other operating device.

The above and other objects and features of the invention, including various novel and desirable structural arrangements, will be apparent from the following description of the illustrative embodiment shown in the accompanying drawing, in which:

The figure is a perspective view of a preferred embodiment.

The illustrated lever is stamped from sheet steel, although it may sometimes be desirable to form it as a forging. In at least the smaller sizes of brakes, such as are used on passenger cars, the stamped lever is of adequate strength and can be made in large quantities at a minimum cost.

The lever, as so formed, has a generally straight lower edge 10, and its outer edge 12 is curved to give the greatest possible clearance for the brake drum, this giving the lever the general appearance of an elongated triangle, with the narrower end at the right and the wider end at the left.

The narrower end of the lever is provided, for example, by having formed therein in the plane of the lever a hook 14, with means for the attachment of the operating cable or other operating means of the brake.

The wider end of the lever is shown formed with a central opening or notch 16, affording clearance for the brake anchor, which projects there-through. On opposite sides of the opening 16 are thrust parts, such as integral lugs 18 and 20 bent laterally upward from the lever, and adapted to project between the ends of the shoes of the brake with the body of the lever between the web of the upper shoe and the backing plate of the brake.

The lever may be reinforced during the stamping operation by embossing therein upper and lower strengthening ribs 22 and 24 along its upper and lower sides. These ribs may, if desired, be arranged for slidable engagement with the side of the web of the upper shoe of the brake.

The arrangement of the novel lever in the brake is fully disclosed, and is claimed, in our prior application No. 454,250, filed May 21, 1930, of which the present application is a division.

While one illustrative embodiment has been described in detail, it is not our intention to limit the scope of the invention to that particular embodiment, or otherwise than by the terms of the appended claims.

We claim:

1. A brake-applying lever of substantial length curved along one side to clear a brake drum, said lever being approximately in the same plane, and which has one relatively narrow end provided with means for the attachment of an operating cable, and which has its other end relatively wide and formed centrally of said end with an opening to clear a brake anchor and with thrust lugs projecting laterally from the lever at right angles to said plane respectively on opposite sides of said opening.

2. A brake-applying lever of sheet metal having its body in a plane having one end relatively narrow and offset in a plane paralleling the body of the lever and formed in said offset plane of the lever with a hook and having its other end relatively wide and formed centrally with an opening to provide clearance for an anchor and with laterally-turned integral thrust lugs on opposite sides of said opening and perpendicular to the plane of the body of the lever.

3. A brake lever comprising a single part arranged substantially in a plane and having a bifurcated end having thrust lugs formed on the two spaced parts thereof and extending at right angles to said plane.

HUMPHREY F. PARKER.
BRYAN E. HOUSE.